United States Patent
Li (10) Patent No.: US 10,216,060 B2
(45) Date of Patent: Feb. 26, 2019

(54) LIQUID CRYSTAL LENS AND MANUFACTURING METHOD THEREOF, DISPLAY DEVICE

(71) Applicant: Boe Technology Group Co., Ltd., Beijing (CN)

(72) Inventor: Zhongxiao Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/569,372

(22) PCT Filed: Mar. 29, 2017

(86) PCT No.: PCT/CN2017/078521
§ 371 (c)(1),
(2) Date: Oct. 25, 2017

(87) PCT Pub. No.: WO2018/014585
PCT Pub. Date: Jan. 25, 2018

(65) Prior Publication Data
US 2018/0224708 A1    Aug. 9, 2018

(30) Foreign Application Priority Data

Jul. 21, 2016  (CN) .......................... 2016 1 0576484

(51) Int. Cl.
*G02F 1/13*    (2006.01)
*G02F 1/29*    (2006.01)
(Continued)

(52) U.S. Cl.
CPC ............. *G02F 1/29* (2013.01); *G02B 27/225* (2013.01); *G02F 1/1343* (2013.01);
(Continued)

(58) Field of Classification Search
None
See application file for complete search history.

(56) References Cited

U.S. PATENT DOCUMENTS

2009/0284827 A1* 11/2009 Verstegen ................ G02B 3/14
359/315
2011/0069243 A1*  3/2011 Chang ............... G02F 1/134309
349/33
(Continued)

FOREIGN PATENT DOCUMENTS

CN      101950085 A     1/2011
CN      102854693 A     1/2013
(Continued)

OTHER PUBLICATIONS

International Search Report and Written Opinion in PCT/CN2017/078521 dated Jun. 7, 2017, with English translation.

*Primary Examiner* — Edward Glick
*Assistant Examiner* — David Chung
(74) *Attorney, Agent, or Firm* — Womble Bond Dickinson (US) LLP (57) ABSTRACT

A liquid crystal lens, a manufacturing method thereof, and a display device are provided. The liquid crystal lens includes a first substrate and a second substrate. A first electrode is disposed on the first substrate. A retardation layer is disposed on a side of the first substrate facing the second substrate. The retardation layer includes a plurality of steps having different heights. A second electrode is disposed on the second substrate. The second electrode includes a plurality of sub-electrodes, the plurality of sub-electrodes being one-to-one corresponding to the plurality of steps. The width of the sub-electrode is smaller than the width of the step corresponding to the sub-electrode. A gap is provided between two adjacent sub-electrodes. One edge of the gap is aligned with a step point of two adjacent steps. A liquid (Continued)

crystal is filled in a space between the retardation layer and the second substrate.

20 Claims, 3 Drawing Sheets

(51) Int. Cl.
  *G02B 27/22* (2018.01)
  *G02F 1/13363* (2006.01)
  *G02F 1/1343* (2006.01)
(52) U.S. Cl.
  CPC .... *G02F 1/13363* (2013.01); *G02F 2201/122* (2013.01); *G02F 2202/40* (2013.01)

(56) References Cited

U.S. PATENT DOCUMENTS

| | | | |
|---|---|---|---|
| 2011/0267570 A1* | 11/2011 | Saito | G02B 3/08 349/139 |
| 2013/0002970 A1 | 1/2013 | Baek et al. | |
| 2013/0010243 A1* | 1/2013 | Wu | B24B 19/028 349/117 |
| 2015/0253579 A1* | 9/2015 | Kim | G02B 27/2214 349/15 |
| 2017/0300152 A1 | 10/2017 | Ye | |

FOREIGN PATENT DOCUMENTS

| | | |
|---|---|---|
| CN | 103185982 A | 7/2013 |
| CN | 104360520 A | 2/2015 |
| CN | 204595388 U | 8/2015 |
| CN | 106019731 A | 10/2016 |
| WO | WO 2014204228 A1 | 12/2014 |

\* cited by examiner

LIQUID CRYSTAL LENS AND MANUFACTURING METHOD THEREOF, DISPLAY DEVICE

CROSS-REFERENCE TO RELATED APPLICATIONS

The present application k the US national phase entry of the international application PCT/CN2017/078521, with an international filing date of Mar. 29, 2017, which claims the benefit of Chinese Patent Application No. 201610576484.3, filed on Jul. 21, 2016, the entire disclosures of which are incorporated herein by reference.

TECHNICAL FIELD

The present invention relates to the field of display technology, and more particularly to a liquid crystal lens, a manufacturing method thereof, and a display device.

BACKGROUND

Liquid crystal lens has excellent performance. The liquid crystal lens can electrically focus, and is widely used in focusing devices and magnifying equipment for human eye, especially in the aspect of 3D display. The application of liquid crystal lens can get rid of the constraints of 3D glasses on the human eye. Naked eye 3D display can thus be provided, which has a huge application prospects in the future.

SUMMARY

The inventors have found that in the structure of the conventional liquid crystal lens, a plurality of electrodes arranged periodically are usually used to drive the liquid crystal molecules to deflect, realizing the parabolic distribution of the optical phase retardation. However, since there is no electrode structure in the gap region between two adjacent electrodes, the optical retardation is lowered in this region, resulting in an unsmooth optical delay curve, affecting the performance of the liquid crystal lens. Therefore, it is desired to provide a liquid crystal lens structure which eliminates the optical retardation deviation in the gap region of the electrodes, thereby improving the performance of the liquid crystal lens.

According to an aspect of the invention, an embodiment of the invention provides a liquid crystal lens. The liquid crystal lens includes a first substrate and a second substrate disposed opposite to the first substrate. A first electrode is disposed on the first substrate. A retardation layer is disposed on a side of the first substrate facing the second substrate. The retardation layer includes a plurality of steps having different heights. A second electrode is disposed on the second substrate. The second electrode is disposed opposite to the first electrode. The second electrode includes a plurality of sub-electrodes, the plurality of sub-electrodes being one-to-one corresponding to the plurality of steps. The width of the sub-electrode is smaller than the width of the step corresponding to the sub-electrode. A gap is provided between two adjacent sub-electrodes. One edge of the gap is aligned with a step point of two adjacent steps. A liquid crystal is filled in a space between the retardation layer and the second substrate.

In the embodiment of the present invention, a retardation layer is disposed on a side of the first substrate facing the second substrate. The retardation layer includes a plurality of steps having different heights. A second electrode is disposed on the second substrate. The second electrode is disposed opposite to the first electrode. The second electrode includes a plurality of sub-electrodes, which are one-to-one corresponding to the plurality of steps. A width of the sub-electrode is smaller than a width of the step corresponding to the sub-electrode. A gap is arranged between two adjacent sub-electrodes, and one edge of the gap is aligned with a step point of two adjacent steps (i.e., the gap is arranged between two adjacent sub-electrodes, the gap corresponds to a peripheral region of the lower step of these two adjacent steps, and the peripheral region is close to the higher step). In the case that the electrodes are not energized, the refractive index is the same everywhere between the first substrate and the second substrate. When a voltage is applied to the first electrode or the second electrode, the liquid crystal is deflected and the refractive index changes. Since the thickness of the liquid crystal layer varies at different places, the optical phase retardation is not the same everywhere. With the above arrangement, the liquid crystal region corresponding to the gap has a small electric field intensity. However, the gap is arranged opposite to a region of a lower step of two adjacent steps, this liquid crystal region thus has a large height. Therefore, the optical phase retardation curve corresponding to the two adjacent steps is no longer a step change but exhibits a gradation characteristic. Therefore, the overall optical phase retardation curve of the liquid crystal lens can exhibit a smooth distribution such as a parabolic shape, improving the performance of the liquid crystal lens.

Optionally, the width of the sub-electrode is 50% to 70% of the width of the corresponding step.

The width of the sub-electrode is set to 50% to 70% of the width of the corresponding step, an electric field of sufficient width can thus be provided by using the sub-electrode, and a sudden drop of the electric field caused by an excessively wide gap can also be prevented.

Optionally, heights of the plurality of steps are sequentially increased from the center to the edge of the liquid crystal lens.

With such an arrangement, an equivalent converging lens can be formed. However, according to the teachings of the present invention, other equivalent lenses (e.g., convex lenses, concave lenses, lenticular lenses) and prisms can also be obtained by using other step arrangements.

Optionally, the plurality of sub-electrodes are a plurality of stripe-shaped sub-electrodes arranged in parallel to each other.

A cylindrical liquid crystal lens can be realized by using a plurality of strip-shaped sub-electrodes arranged in parallel to each other. A plurality of cylindrical liquid crystal lenses can be arranged in parallel to realize the cylindrical grating in the 3D display.

Optionally, the liquid crystal lens further includes an electrode wire. Both ends of the stripe-shaped sub-electrode are electrically connected to the electrode wire.

Typically, the first electrode and the second electrode are not connected to the downstream circuit. However, when the area of the liquid crystal lens is large, a defect such as electric leakage may cause a difference in voltage across the electrode. Thus, the plurality of sub-electrodes are electrically connected to each other, thereby increasing the voltage uniformity of the sub-electrodes, further improving the performance of the liquid crystal lens.

Optionally, the plurality of sub-electrodes include a circular sub-electrode and a plurality of annular sub-electrodes taking the circular sub-electrode as a center of a circle.

By arranging the plurality of sub-electrodes in such a manner, a circular liquid crystal lens can be realized for achieving an optical function such as focusing.

Optionally, the liquid crystal lens further includes a linear electrode wire passing through the circular sub-electrode and the plurality of annular sub-electrodes. The linear electrode wire is electrically connected to the circular sub-electrode and the plurality of annular sub-electrodes at each intersection.

When the area of the liquid crystal lens is large, defects such as electric leakage may cause a difference in voltage across the electrode. Therefore, with the above arrangement, the voltage uniformity of the circular sub-electrode and the plurality of annular sub-electrodes can be increased, and the performance of the liquid crystal lens is further improved.

Optionally, the first electrode and the second electrode are transparent electrodes.

The first electrode and the second electrode can be made of a transparent material, and the absorption or reflection of light by the liquid crystal lens can be reduced, thereby improving the efficiency of the light source.

Optionally, a material of the retardation layer is an amorphous transparent material.

An amorphous transparent material such as amorphous glass or a resin can be used as the retardation layer, and the polarized light in each direction has the same refractive index in the retardation layer. Therefore, it is only necessary to consider the effect of different thicknesses across the liquid crystal layer on the optical phase retardation in the design. Moreover, the amorphous transparent material requires no arrangement on the orientation of the crystal axis, simplifying the design.

Optionally, a refractive index of the retardation layer is equal to an ordinary refractive index of the liquid crystal.

The refractive index of the retardation layer is set to be equal to the ordinary refractive index of the liquid crystal. When the electrodes are not energized, the long axis of the liquid crystal molecules is substantially parallel to the surfaces of the first substrate and the second substrate, and the incident light is an ordinary light for the liquid crystal molecules. With the above arrangement, when the electrodes are not energized, the refractive index between the first substrate and the second substrate is more uniform everywhere, and the disturbance to light is reduced.

Optionally, the liquid crystal is a twisted nematic liquid crystal.

With the twisted nematic liquid crystal, it is possible to easily control the deflection of the liquid crystal molecules with the electric field, thereby stably controlling the switching of the liquid crystal lens.

According to another aspect of the present invention, an embodiment of the present invention provides a display device. The display device includes a display panel and the above mentioned liquid crystal lens. The liquid crystal lens is arranged on a light exit side of the display panel.

According to still another aspect of the present invention, an embodiment of the present invention provides a method for manufacturing a liquid crystal lens. The method includes the following steps: providing a first substrate and a second substrate disposed opposite to the first substrate; disposing a first electrode on the first substrate; disposing a retardation layer on a side of the first substrate facing the second substrate. The retardation layer including a plurality of steps having different heights; disposing a second electrode on the second substrate; the second electrode being disposed opposite to the first electrode; the second electrode including a plurality of sub-electrodes, the plurality of sub-electrodes being one-to-one corresponding to the plurality of steps; a width of the sub-electrode being smaller than a width of the step corresponding to the sub-electrode; disposing a gap between two adjacent sub-electrodes, one edge of the gap being aligned with a step point of two adjacent steps; and filling a space between the retardation layer and the second substrate with a liquid crystal.

In the embodiment of the present invention, with the above arrangement, the liquid crystal region corresponding to the gap has a small electric field intensity. However, the gap is arranged opposite to a region of a lower step of two adjacent steps, this liquid crystal region thus has a large height. Therefore, the optical phase retardation curve corresponding to the two adjacent steps is no longer a step change but exhibits a gradation characteristic. Therefore, the overall optical phase retardation curve of the liquid crystal lens can exhibit a smooth distribution such as a parabolic shape, improving the performance of the liquid crystal lens.

Optionally, the method further includes: electrically connecting the plurality of sub-electrodes to each other.

Typically, the first electrode and the second electrode are not connected to the downstream circuit. However, when the area of the liquid crystal lens is large, a defect such as electric leakage may cause a difference in voltage across the electrode. Thus, the plurality of sub-electrodes are electrically connected to each other, thereby increasing the voltage uniformity of the sub-electrodes, further improving the performance of the liquid crystal lens.

Optionally, a material of the retardation layer is an amorphous transparent material.

An amorphous transparent material such as amorphous glass or a resin can be used as the retardation layer, and the polarized light in each direction has the same refractive index in the retardation layer. Therefore, it is only necessary to consider the effect of different thicknesses across the liquid crystal layer on the optical phase retardation in the design. Moreover, the amorphous transparent material requires no arrangement on the orientation of the crystal axis, simplifying the design.

Optionally, a refractive index of the retardation layer is equal to an ordinary refractive index of the liquid crystal.

The refractive index of the retardation layer is set to be equal to the ordinary refractive index of the liquid crystal. When the electrodes are not energized, the refractive index between the first substrate and the second substrate is more uniform everywhere, and the disturbance to light is reduced.

DETAILED DESCRIPTION OF THE INVENTION

In the following, the technical solutions in embodiments of the invention will be described clearly and completely in connection with the drawings in the embodiments of the invention. Obviously, the described embodiments are only part of the embodiments of the invention, and not all of the embodiments. Based on the embodiments in the invention, all other embodiments obtained by those of ordinary skills in the art under the premise of not paying out creative work pertain to the protection scope of the invention.

Figure 1:
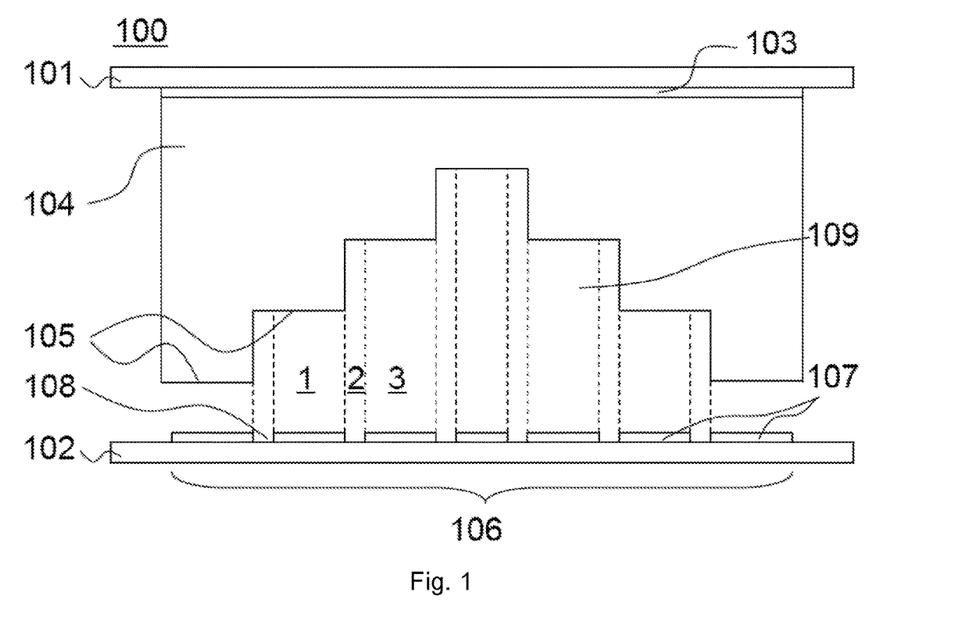
FIG. 1 shows a structural schematic diagram of a liquid crystal lens according to an embodiment of the present invention.

According to an aspect of the invention, an embodiment of the invention provides a liquid crystal lens. As shown in FIG. 1, the liquid crystal lens 100 includes a first substrate 101 and a second substrate 102 disposed opposite to the first substrate 101. A first electrode 103 is disposed on the first substrate 101. A retardation layer 104 is disposed on a side of the first substrate 101 facing the second substrate 102, the retardation layer 104 includes a plurality of steps 105 having different heights. A second electrode 106 is disposed on the second substrate 102. The second electrode 106 is disposed opposite to the first electrode 103. The second electrode 106 includes a plurality of sub-electrodes 107, the plurality of sub-electrodes 107 being one-to-one corresponding to the plurality of steps 105. The width of the sub-electrode 107 is smaller than the width of the step 105 corresponding to the sub-electrode 107. A gap 108 is provided between two adjacent sub-electrodes 107. One edge of the gap 108 is aligned with a step point of two adjacent steps 105. A liquid crystal 109 is filled in a space between the retardation layer 104 and the second substrate 102.

In the embodiment of the present invention, a retardation layer 104 is disposed on a side of the first substrate 101 facing the second substrate 102. The retardation layer 104 includes a plurality of steps 105 having different heights. A second electrode 106 is disposed on the second substrate 102. The second electrode 106 is disposed opposite to the first electrode 103. The second electrode 106 includes a plurality of sub-electrodes 107, which are one-to-one corresponding to the plurality of steps 105. A width of the sub-electrode 107 is smaller than a width of the step 105 corresponding to the sub-electrode 107. A gap 108 is arranged between two adjacent sub-electrodes 107, and one edge of the gap 108 is aligned with a step point of two adjacent steps 105 (i.e., the gap 108 is arranged between two adjacent sub-electrodes 107, the gap 108 corresponds to a peripheral region of the lower step of these two adjacent steps 105, and the peripheral region is close to the higher step). In the case that the electrodes are not energized, the refractive index is the same everywhere between the first substrate 101 and the second substrate 102. The optical phase retardation of the liquid crystal layer is n·d, where n is the refractive index of the liquid crystal layer for the incident light, and d is the thickness of the liquid crystal layer. When a voltage is applied to the first electrode 103 or the second electrode 106, the liquid crystal is deflected and the refractive index changes. Since the thickness of the liquid crystal layer varies at different places, the optical phase retardation is not the same everywhere. With the above arrangement, the liquid crystal region corresponding to the gap 108 has a small electric field intensity. However, the gap 108 is arranged opposite to a region of a lower step of two adjacent steps 105, this liquid crystal region thus has a large height. Therefore, the optical phase retardation curve corresponding to the two adjacent steps 105 is no longer a step change but exhibits a gradation characteristic. In particular, the optical phase retardation of the region 1, region 2 and region 3 in FIG. 1 are $n_1 \cdot d_1$, $n_2 \cdot d_2$ and $n_3 \cdot d_3$, respectively. $n_1$, $n_2$ and $n_3$ are respectively the refractive indices of the liquid crystal layers in the region 1, region 2 and region 3 for the incident light. $d_1$, $d_2$ and $d_3$ are respectively the thicknesses of the liquid crystal layers in the region 1, region 2 and region 3. Although $d_2$ and $d_3$ are approximately equal, the electric field intensity in region 2 is small due to the presence of the gap 108, so that $n_2$ is less than $n_3$. Therefore, the optical phase retardation of region 1, region 2 and region 3 has the following relationship: $n_1 \cdot d_1 < n_2 \cdot d_2 < n_3 \cdot d_3$. Therefore, the overall optical phase retardation curve of the liquid crystal lens 100 can exhibit a smooth distribution such as a parabolic shape, improving the performance of the liquid crystal lens.

It can be understood by those skilled in the art that in order to achieve an electric field distributed in the above-described form, the first electrode 103 can be arranged between the first substrate 101 and the retardation layer 104 or can be arranged on a surface of the first substrate 101 departing from the second substrate 102.

Optionally, the width of the sub-electrode 107 is 50% to 70% of the width of the corresponding step 105.

The width of the sub-electrode 107 is set to 50% to 70% of the width of the corresponding step 105, an electric field of sufficient width can thus be provided by using the sub-electrode 107, and a sudden drop of the electric field caused by an excessively wide gap 108 can also be prevented.

Optionally, heights of the plurality of steps 105 are sequentially increased from the center to the edge of the liquid crystal lens 100.

With such an arrangement, an equivalent converging lens can be formed. However, according to the teachings of the present invention, other equivalent lenses (e.g., convex lenses, concave lenses, lenticular lenses) and prisms can also be obtained by using other step arrangements.

Figure 2:
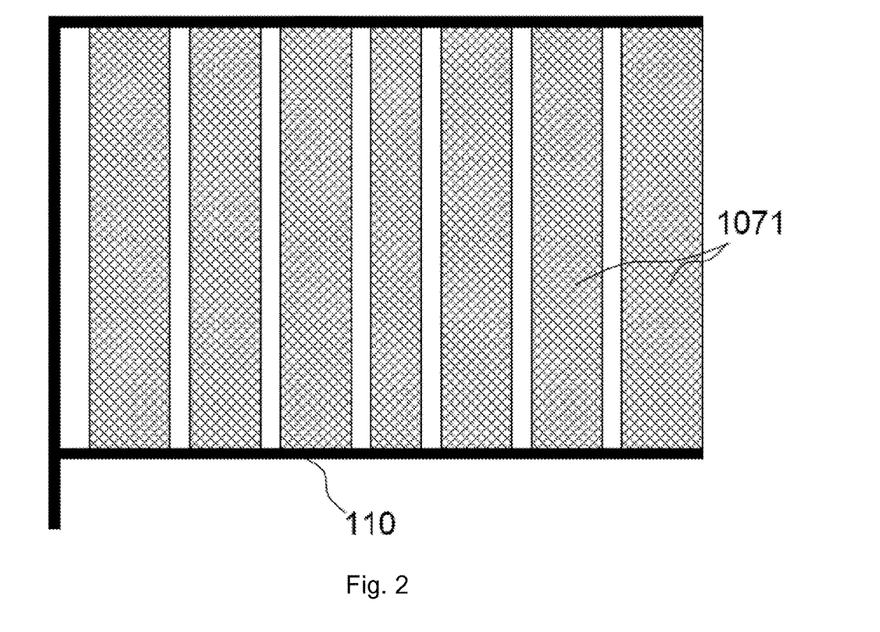
FIG. 2 shows a top view of a sub-electrode in a liquid crystal lens according to an embodiment of the present invention.

In an embodiment, as shown in FIG. 2, optionally, the plurality of sub-electrodes can be a plurality of stripe-shaped sub-electrodes 1071 arranged in parallel to each other.

A cylindrical liquid crystal lens can be realized by using a plurality of strip-shaped sub-electrodes 1071 arranged in parallel to each other. A plurality of cylindrical liquid crystal lenses can be arranged in parallel to realize the cylindrical grating in the 3D display.

In an embodiment, as shown in FIG. 2, optionally, the liquid crystal lens further includes an electrode wire 110. Both ends of the stripe-shaped sub-electrode 1071 are electrically connected to the electrode wire 110.

Typically, the first electrode and the second electrode are not connected to the downstream circuit. However, when the area of the liquid crystal lens is large, a defect such as electric leakage may cause a difference in voltage across the electrode. Thus, the plurality of sub-electrodes are electrically connected to each other, thereby increasing the voltage uniformity of the sub-electrodes, further improving the performance of the liquid crystal lens.

Figure 3:
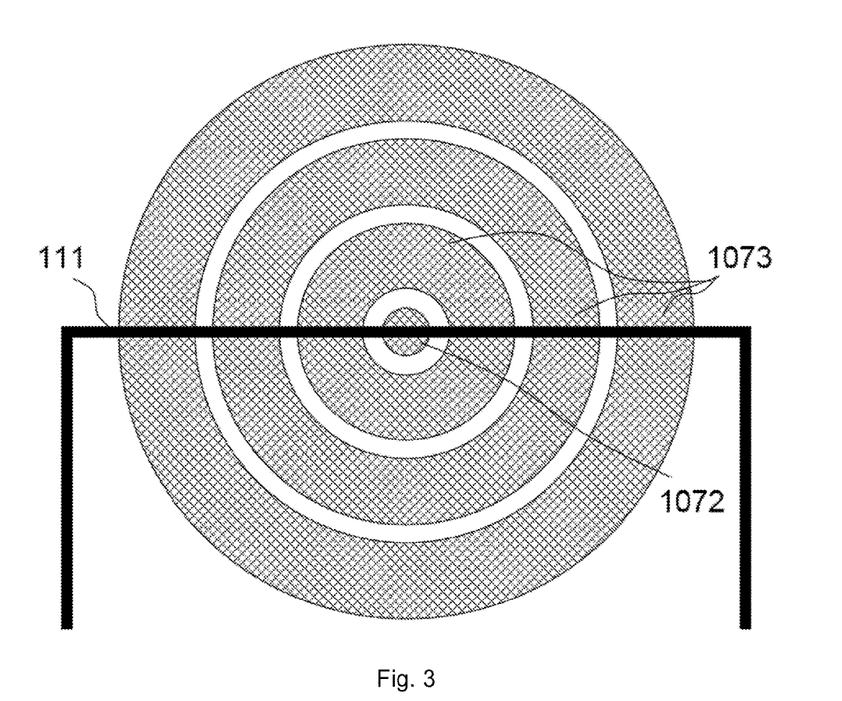
FIG. 3 shows a top view of a sub-electrode in a liquid crystal lens according to another embodiment of the present invention.

In an embodiment, as shown in FIG. 3, optionally, the plurality of sub-electrodes include a circular sub-electrode 1072 and a plurality of annular sub-electrodes 1073 taking the circular sub-electrode 1072 as a center of a circle.

By arranging the plurality of sub-electrodes in such a manner, a circular liquid crystal lens can be realized for achieving an optical function such as focusing.

In an embodiment, as shown in FIG. 3, optionally, the liquid crystal lens further includes a linear electrode wire 111 passing through the circular sub-electrode 1072 and the plurality of annular sub-electrodes 1073. The linear electrode wire 111 is electrically connected to the circular sub-electrode 1072 and the plurality of annular sub-electrodes 1073 at each intersection.

When the area of the liquid crystal lens is large, defects such as electric leakage may cause a difference in voltage across the electrode. Therefore, with the above arrangement, the voltage uniformity of the circular sub-electrode 1072 and the plurality of annular sub-electrodes 1073 can be increased, and the performance of the liquid crystal lens is further improved.

Optionally, the first electrode 103 and the second electrode 106 are transparent electrodes.

The first electrode and the second electrode can be made of a transparent material, and the absorption or reflection of light by the liquid crystal lens can be reduced, thereby improving the efficiency of the light source.

Optionally, a material of the retardation layer 104 is an amorphous transparent material.

An amorphous transparent material such as amorphous glass or a resin can be used as the retardation layer, and the polarized light in each direction has the same refractive index in the retardation layer. Therefore, it is only necessary to consider the effect of different thicknesses across the liquid crystal layer on the optical phase retardation in the design. Moreover, the amorphous transparent material requires no arrangement on the orientation of the crystal axis, simplifying the design.

Optionally, a refractive index of the retardation layer 104 is equal to an ordinary refractive index of the liquid crystal 109.

The refractive index of the retardation layer 104 is set to be equal to the ordinary refractive index of the liquid crystal 109. When the electrodes are not energized, the long axis of the liquid crystal molecules is substantially parallel to the surfaces of the first substrate 101 and the second substrate 102, and the incident light is an ordinary light for the liquid crystal molecules. With the above arrangement, when the electrodes are not energized, the refractive index between the first substrate 101 and the second substrate 102 is more uniform everywhere, and the disturbance to light is reduced.

Optionally, the liquid crystal 109 is a twisted nematic liquid crystal.

With the twisted nematic liquid crystal, it is possible to easily control the deflection of the liquid crystal molecules with the electric field, thereby stably controlling the switching of the liquid crystal lens.

Figure 4:
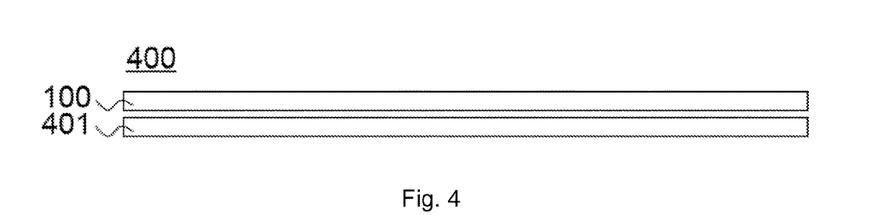
FIG. 4 shows a structural schematic diagram of a display device according to an embodiment of the present invention.

According to another aspect of the present invention, an embodiment of the present invention provides a display device. As shown in FIG. 4, the display device 400 includes a display panel 401 and the above mentioned liquid crystal lens 100. The liquid crystal lens 100 is arranged on a light exit side of the display panel 401. The display device 400 can be any product or component with display function, such as mobile phone, tablet computer, TV, display, notebook computer, digital photo frame and navigator. The implementation of the display device can refer to the embodiments of the above mentioned liquid crystal lens, which will not be repeated herein.

Figure 5:
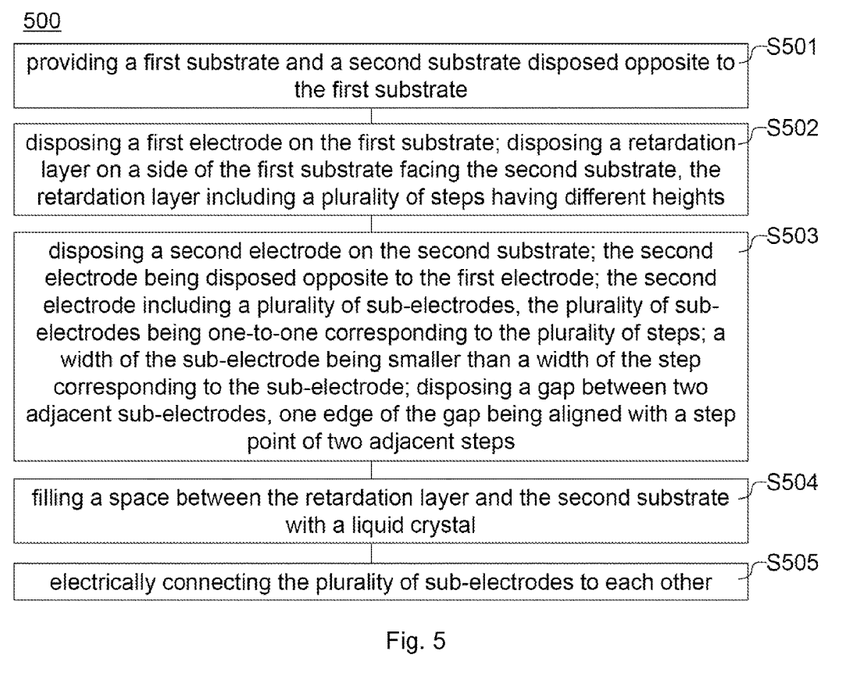
FIG. 5 shows a flowchart of a method for manufacturing a liquid crystal lens according to an embodiment of the present invention.

According to still another aspect of the present invention, an embodiment of the present invention provides a method for manufacturing a liquid crystal lens. As shown in FIG. 5, the method 500 includes the following steps. S501, providing a first substrate and a second substrate disposed opposite to the first substrate. S502, disposing a first electrode on the first substrate; disposing a retardation layer on a side of the first substrate facing the second substrate, the retardation layer including a plurality of steps having different heights. S503, disposing a second electrode on the second substrate; the second electrode being disposed opposite to the first electrode; the second electrode including a plurality of sub-electrodes, the plurality of sub-electrodes being one-to-one corresponding to the plurality of steps; a width of the sub-electrode being smaller than a width of the step corresponding to the sub-electrode; disposing a gap between two adjacent sub-electrodes, one edge of the gap being aligned with a step point of two adjacent steps. S504, filling a space between the retardation layer and the second substrate with a liquid crystal.

In the embodiment of the present invention, with the above arrangement, the liquid crystal region corresponding to the gap has a small electric field intensity. However, the gap is arranged opposite to a region of a lower step of two adjacent steps, this liquid crystal region thus has a large height. Therefore, the optical phase retardation curve corresponding to the two adjacent steps is no longer a step change but exhibits a gradation characteristic. Therefore, the overall optical phase retardation curve of the liquid crystal lens can exhibit a smooth distribution such as a parabolic shape, improving the performance of the liquid crystal lens.

Optionally, the method further includes: S505, electrically connecting the plurality of sub-electrodes to each other.

Typically, the first electrode and the second electrode are not connected to the downstream circuit. However, when the area of the liquid crystal lens is large, a defect such as electric leakage may cause a difference in voltage across the electrode. Thus, the plurality of sub-electrodes are electrically connected to each other, thereby increasing the voltage uniformity of the sub-electrodes, further improving the performance of the liquid crystal lens.

Optionally, a material of the retardation layer is an amorphous transparent material.

An amorphous transparent material such as amorphous glass or a resin can be used as the retardation layer, and the polarized light in each direction has the same refractive index in the retardation layer. Therefore, it is only necessary to consider the effect of different thicknesses across the liquid crystal layer on the optical phase retardation in the design. Moreover, the amorphous transparent material requires no arrangement on the orientation of the crystal axis, simplifying the design.

Optionally, a refractive index of the retardation layer is equal to an ordinary refractive index of the liquid crystal.

The refractive index of the retardation layer is set to be equal to the ordinary refractive index of the liquid crystal. When the electrodes are not energized, the refractive index between the first substrate and the second substrate is more uniform everywhere, and the disturbance to light is reduced.

In the liquid crystal lens, manufacturing method thereof, and display device provided by the embodiment of the present invention, a retardation layer is disposed on a side of the first substrate facing the second substrate. The retardation layer includes a plurality of steps having different heights. A second electrode is disposed on the second substrate. The second electrode is disposed opposite to the first electrode. The second electrode includes a plurality of sub-electrodes, which are one-to-one corresponding to the plurality of steps. A width of the sub-electrode is smaller than a width of the step corresponding to the sub-electrode. A gap is arranged between two adjacent sub-electrodes, and one edge of the gap is aligned with a step point of two adjacent steps (i.e., the gap is arranged between two adjacent sub-electrodes, the gap corresponds to a peripheral region of the lower step of these two adjacent steps, and the peripheral region is close to the higher step). In the case that the electrodes are not energized, the refractive index is the same everywhere between the first substrate and the second substrate. When a voltage is applied to the first electrode or the second electrode, the liquid crystal is deflected and the refractive index changes. Since the thickness of the liquid crystal layer varies at different places, the optical phase retardation is not the same everywhere. With the above arrangement, the liquid crystal region corresponding to the gap has a small electric field intensity. However, the gap is arranged opposite to a region of a lower step of two adjacent steps, this liquid crystal region thus has a large height. Therefore, the optical phase retardation curve corresponding to the two adjacent steps is no longer a step change but exhibits a gradation characteristic. Therefore, the overall optical phase retardation curve of the liquid crystal lens can exhibit a smooth distribution such as a parabolic shape, improving the performance of the liquid crystal lens.

Apparently, the person skilled in the art may make various alterations and variations to the invention without departing the spirit and scope of the invention. As such, provided that these modifications and variations of the invention pertain to the scope of the claims of the invention and their equivalents, the invention is intended to embrace these alterations and variations.

What is claimed is:

1. A liquid crystal lens, comprising:
   a first substrate and a second substrate disposed opposite to the first substrate;
   a first electrode disposed on the first substrate;
   a retardation layer disposed on a side of the first substrate facing the second substrate, the retardation layer comprising a plurality of steps having different heights;
   a second electrode disposed on the second substrate; the second electrode being disposed opposite to the first electrode; the second electrode comprising a plurality of sub-electrodes, the plurality of sub-electrodes being one-to-one corresponding to the plurality of steps; a width of the sub-electrode being smaller than a width of the step corresponding to the sub-electrode; a gap being provided between two adjacent sub-electrodes, and one edge of the gap being aligned with a step point of two adjacent steps; and
   a liquid crystal filled in a space between the retardation layer and the second substrate.

2. The liquid crystal lens according to claim 1, wherein the width of the sub-electrode is 50% to 70% of the width of the corresponding step.

3. The liquid crystal lens according to claim 1, wherein heights of the plurality of steps are sequentially increased from the center to the edge of the liquid crystal lens.

4. The liquid crystal lens according to claim 1, wherein the plurality of sub-electrodes are a plurality of stripe-shaped sub-electrodes arranged in parallel to each other.

5. The liquid crystal lens according to claim 4, further comprising an electrode wire, both ends of the stripe-shaped sub-electrode being electrically connected to the electrode wire.

6. The liquid crystal lens according to claim 1, wherein the plurality of sub-electrodes comprise a circular sub-electrode and a plurality of annular sub-electrodes taking the circular sub-electrode as a center of a circle.

7. The liquid crystal lens according to claim 6, further comprising a linear electrode wire passing through the circular sub-electrode and the plurality of annular sub-electrodes, the linear electrode wire being electrically connected to the circular sub-electrode and the plurality of annular sub-electrodes at each intersection.

8. The liquid crystal lens according to claim 1, wherein the first electrode and the second electrode are transparent electrodes.

9. The liquid crystal lens according to claim 1, wherein a material of the retardation layer is an amorphous transparent material.

10. The liquid crystal lens according to claim 1, wherein a refractive index of the retardation layer is equal to an ordinary refractive index of the liquid crystal.

11. The liquid crystal lens according to claim 1, wherein the liquid crystal is a twisted nematic liquid crystal.

12. A display device, comprising:
    a display panel; and
    a liquid crystal lens arranged on a light exit side of the display panel;
    wherein the liquid crystal lens comprises:
      a first substrate and a second substrate disposed opposite to the first substrate;
      a first electrode disposed on the first substrate;
      a retardation layer disposed on a side of the first substrate facing the second substrate, the retardation layer comprising a plurality of steps having different heights;
      a second electrode disposed on the second substrate; the second electrode being disposed opposite to the first electrode; the second electrode comprising a plurality of sub-electrodes, the plurality of sub-electrodes being one-to-one corresponding to the plurality of steps; a width of the sub-electrode being smaller than a width of the step corresponding to the sub-electrode; a gap being provided between two adjacent sub-electrodes, and one edge of the gap being aligned with a step point of two adjacent steps; and
      a liquid crystal filled in a space between the retardation layer and the second substrate.

13. A method for manufacturing a liquid crystal lens, comprising:
    providing a first substrate and a second substrate disposed opposite to the first substrate;
    disposing a first electrode on the first substrate; disposing a retardation layer on a side of the first substrate facing the second substrate, the retardation layer comprising a plurality of steps having different heights;
    disposing a second electrode on the second substrate; the second electrode being disposed opposite to the first electrode; the second electrode comprising a plurality of sub-electrodes, the plurality of sub-electrodes being one-to-one corresponding to the plurality of steps; a width of the sub-electrode being smaller than a width of the step corresponding to the sub-electrode; disposing a gap between two adjacent sub-electrodes, one edge of the gap being aligned with a step point of two adjacent steps; and
    filling a space between the retardation layer and the second substrate with a liquid crystal.

14. The method according to claim 13, further comprising: electrically connecting the plurality of sub-electrodes to each other.

15. The method according to claim 13, wherein a material of the retardation layer is an amorphous transparent material.

16. The method according to claim 13, wherein a refractive index of the retardation layer is equal to an ordinary refractive index of the liquid crystal.

17. The display device according to claim 12, the plurality of sub-electrodes are a plurality of stripe-shaped sub-electrodes arranged in parallel to each other.

18. The display device according to claim 17, further comprising an electrode wire, both ends of the stripe-shaped sub-electrode being electrically connected to the electrode wire.

19. The display device according to claim 12, wherein the plurality of sub-electrodes comprise a circular sub-electrode and a plurality of annular sub-electrodes taking the circular sub-electrode as a center of a circle.

20. The display device according to claim 19, further comprising a linear electrode wire passing through the circular sub-electrode and the plurality of annular sub-electrodes, the linear electrode wire being electrically connected to the circular sub-electrode and the plurality of annular sub-electrodes at each intersection.

* * * * *